Aug. 17, 1965 G. CARPENTER 3,201,099

METHODS OF EXPANDING PERLITE AND LIKE MATERIALS

Filed Sept. 28, 1961 2 Sheets-Sheet 1

INVENTOR.
GEORGE CARPENTER
BY Jacobs & Jacobs
ATTORNEYS

Inventor:
George Carpenter
By: Albert L Jacobs
Attorney

United States Patent Office 3,201,099

Patented Aug. 17, 1965

3,201,099

METHODS OF EXPANDING PERLITE AND LIKE MATERIALS

George Carpenter, Surbiton, England, assignor to British & Overseas Minerals Limited, London, England, a company of Great Britain and Northern Ireland Filed Sept. 28, 1961, Ser. No. 141,386
4 Claims. (Cl. 263—21)

This invention relates to a method and apparatus for the heat treatment of a volcanic glass known as Perlite and like materials which expand on being heat treated.

A number of types of plants for expanding Perlite are known. One of these is based on the method of dropping crushed and graded Perlite rock into gases having a high velocity and temperature, in either a vertical or horizontal type of furnace. The particles after being rapidly expanded are removed from the furnace either by being carried by the gases into a collector or by being carried off in an exhaust system whence they are passed through cyclones for separation and thence to storage bins.

One disadvantage of these known methods and plants is that the smaller particles of Perlite are expanded much more rapidly than the larger ones. This results in the smaller particles being over-expanded into a woolly fluff or dust, while the larger particles which are subjected to the same conditions are left with a central core which is untreated. The cellular structure of the over-expanded particles is liable to be porous and rather fragile. The over-expansion of the Perlite often results in lack of control used during the furnacing.

According to the present invention there is provided a method of processing expandable volcanic rock known as Perlite and like expandable materials in a furnace including the steps of preparing the furnacing atmosphere by partial combustion in one or more combustion chambers, passing said partially combusted furnacing atmosphere into a processing chamber in which complete combustion takes place, delivering the Perlite to be processed into the processing chamber, and drawing off the Perlite so expanded.

According to a further feature of the invention there is provided apparatus for processing expandable volcanic rock known as Perlite and like expandable materials including a furnace having one or more combustion chambers in which the furnacing atmosphere is prepared and partially burnt, a processing chamber arranged at the gas outlet of the combustion chamber or chambers in which complete combustion takes place, means for delivering the Perlite to be processed into said processing chamber and means for drawing off the Perlite so expanded.

Figure 1:
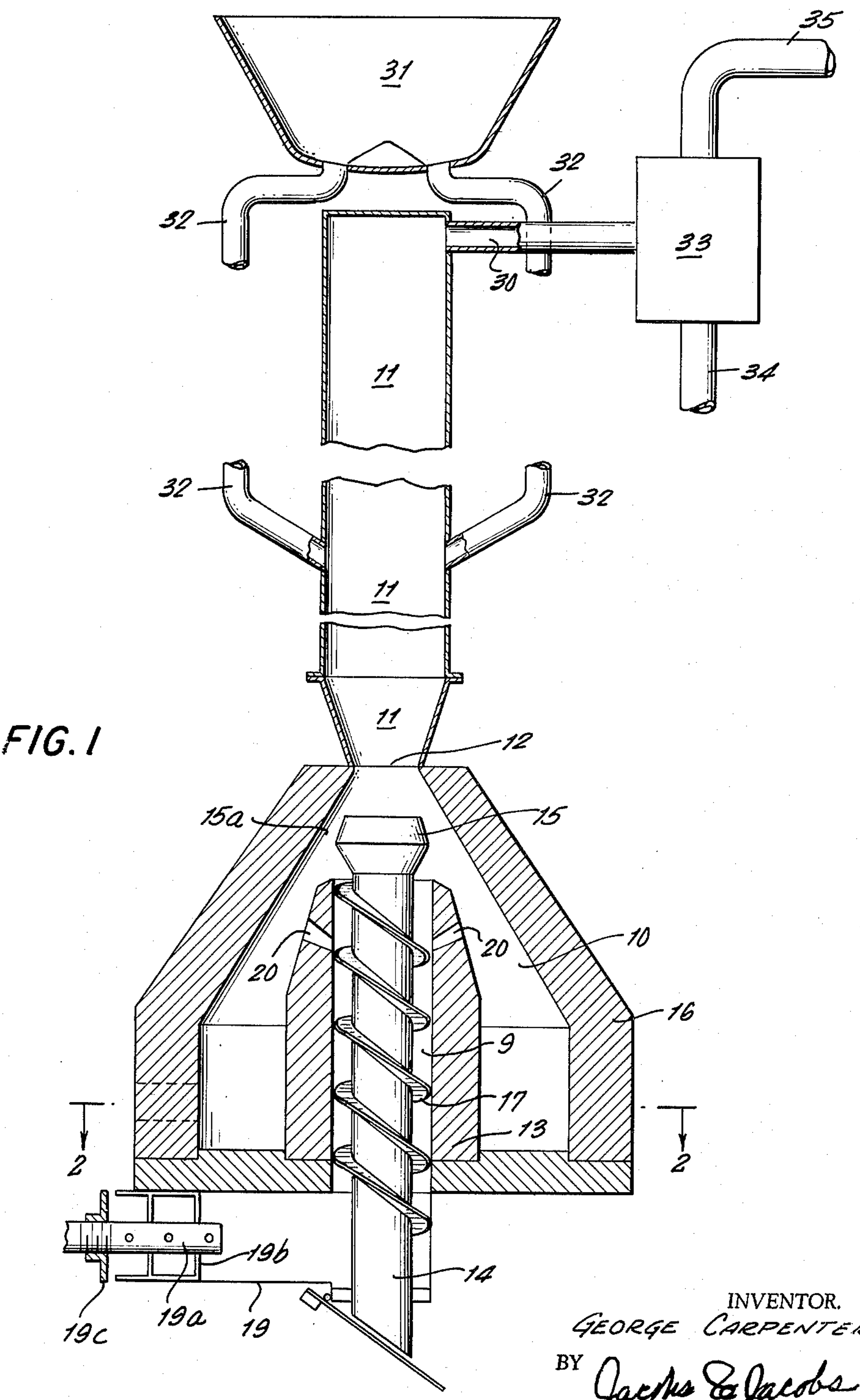
Figure 2:
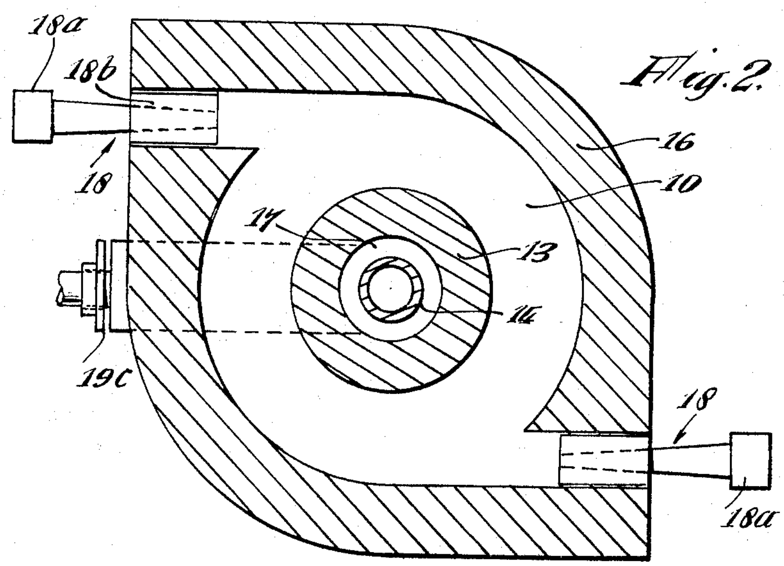

The present invention will now be described in greater detail by way of example with reference to the accompanying drawings, wherein:

FIGURE 1 is a part sectional elevation view of one type of vertical furnace for processing Perlite, and FIGURE 2 is a sectional plan view on the line 2—2 of FIGURE 1.

Referring to FIGURES 1 and 2, the furnace essentially comprises a combustion chamber 10 in which the furnacing atmosphere is prepared and in which partial combustion of the gases takes place, and a processing chamber 11, in which complete combustion takes place in the presence of the Perlite to be treated. The two chambers 10 and 11 are interconnected through a narrow circular passage or nozzle 12. The combustion chamber 10 is provided with a central inner tube 13 made of refractory material. Inside the tube 13 there is provided a second tube 14 which carries a funnel 15 at its upper end just below the nozzle portion 12. The vertical position of the funnel 15 can be adjusted to vary the size of the annular flow passage 15*a* between the funnel 15 and the outer casing 16. The outside circumferential surface of the tube 13 serves as the inner wall of the combustion chamber whilst the inside wall of the outer casing 16 of the furnace provides the outside wall thereof. Attached to the tube 14 are a series of fins 17 which are inclined to the horizontal so as to form a spiral passage 9 between the outside of tube 14 and the inside of tube 13, from top to bottom.

The spiral passage 9 between the tubes 13, 14 is connected at its lower end with an air supply pipe 19. A small pipe 19*a* is mounted co-axial in the pipe 19 by holed mounting plates or spacers 19*b*. The pipe 19*a* is threaded, or carries a threaded collar on which a damper plate 19*c* is mounted. This plate 19*c* can be moved towards and away from the end of the pipe 19 to vary the area through which air can be drawn into the pipe 19. The pipe 19*a* may be provided simply as a mounting for the damper plate 19*c* but it may also be connected to a source of air under pressure. With this arrangement air can be forced under pressure into the pipe 19 to increase the air throughput of the apparatus. This may be expedient to increase the output of the apparatus. However, the main air throughput of the apparatus will be created by a suction fan acting at the discharge end of the processing chamber 11.

At the base of the combustion chamber are located the burner units 18. These units may be gas or oil fired and in FIGURE 2 a tuyere or other fuel injection device 18*a* is diagrammatically shown supplying fuel to a burner block 18*b*. The burner blocks 18*b* are set to direct the fuel mixture issuing therefrom tangentially into the combustion chamber 10 so this mixture burns with a highly reducing atmosphere and swirls around the combustion chamber 10. It is found that this swirling motion within the heated furnace linings ensures the complete burning of carbon that may result from the fuel mixture injected into the combustion chamber 10 containing an excess of fuel. Highly reducing atmosphere means an excess of fuel over the ultimate air requirement, and little or no deposit can stay on the heated furnace linings when in operation.

The partially combusted fuel mixture swirls up the combustion chamber 10 until it reaches the level of port 20. These ports are set tangentially to the flow of air in the spiral passage 9 so that air passes therethrough and is injected into the fuel mixture. This air injection increases or helps to sustain the swirl of the mixture and further preliminary combustion of the fuel in the mixture occurs above the ports 20. When the partially combusted fuel mixture reaches the top of the spiral passage 9, a substantial quantity of air, having a swirling motion, is added to it. The quantity of secondary air added is carefully regulated so that the partially combusted fuel mixture passing through the orifice 12 contains the correct proportions of air and fuel for complete combustion to occur in the processing chamber 11.

The processing chamber is a vertical tube in which the gases expand in travelling up and in which complete combustion occurs. After passing up the processing chamber 11, the gases are drawn off through the outlet 30 at the upper end thereof. The Perlite to be treated which has previously been crushed and graded is fed into the processing chamber 11 from a hopper 31 through outlets 32. As it falls down the chamber it becomes heated by the gases and is expanded. The material which becomes fully expanded in this process then rises upwards with the gases and is separated from the gases by means of a known form of separating cyclone system 33. The dross, that is the material which does not expand owing to its unsuitability, drops through the nozzle 12 into the funnel 15 and so out of the furnace. The air in the passage 9 maintains the tube 14 cool and consequently clinker is not formed from the dross in this tube.

By way of illustration only and for a particular type size and grade of Perlite, the fuel mixture below the level of the ports 20 may reach a temperature of about 900° C., the fuel mixture passing through the orifice 12 may reach a temperature of about 1000° C., and the high temperature zone of the processing chamber may reach a temperature of about 1150° C., and this chamber may comprise a first section, including the high temperature zone and into which previously crushed and graded Perlite is fed from a hopper, about 9 feet long and a second section about 12 feet long but of smaller diameter with the discharge end held between 800° C. and 950° C. The furnacing atmosphere in the processing chamber 11 is usually held on the edge of a reducing atmosphere, that is to say the furnacing atmosphere is just a reducing atmosphere. However, the furnacing atmosphere may be adjusted through a wide variation according to the bulk density of the output that is required and the apparatus can thus be adjusted to provide the desired output from a given input grade and size of Perlite.

With the illustrated examples described above it is possible to control the furnacing atmosphere so as to ensure that the Perlite receives an even heat treatment, which is essential in order to obtain a good and strong finished product.

What I claim and desire to secure by Letters Patent is:

1. A furnace for heat treating expandable volcanic rock known as Perlite and like expandable materials comprising a vertical combustion chamber bounded by a circular wall and closed at its lower end having an outlet at the upper end, separate inlets for fuel mixture and air, a centrally located first tube arranged below the outlet, said tube extending downwardly through the combustion chamber and out through the lower end thereof a second tube arranged concentrically around said first tube, a series of fins secured to the outer surface of said first tube, said fins being inclined to the horizontal, the air inlet being connected to the second tube; a vertical processing chamber bounded by a circular wall arranged above and connected to the combustion chamber, means for imparting rotary movement to the fuel mixture located in the fuel inlet to the combustion chamber, means located at the top of the processing chamber for delivering the Perlite to be treated in free fall downwardly against the upward flow of combustion gases in the processing chamber and means located at the upper end of the processing chamber for drawing off the expanded Perlite which has been carried upwardly with the combustion gases.

2. A furnace for heat treating expandable volcanic rock known as Perlite and like expandable materials comprising a vertical combustion chamber bounded by a wall consisting of a circular lower part and a frusto-conical upper part, said chamber having an outlet at the tapered upper end thereof, separate inlets for fuel mixture and air, a centrally located first tube arranged below the outlet, said tube extending downwardly through the combustion chamber and out through the lower end thereof, a second tube arranged concentrically around said first tube, a series of fins secured to the outer surface of said first tube, said fins being inclined to the horizontal, the air inlet being connected to the second tube; a vertical processing chamber bounded by a wall arranged above the combustion chamber, a nozzle connected to the outlet of the combustion chamber and the lower end of the processing chamber, a pair of nozzles arranged tangentially to the inner wall at the base of the combustion chamber through which the fuel mixture is injected into the combustion chamber, means located at the top of the processing chamber for delivering the Perlite to be treated in free fall downwardly against the upward flow of combustion gases in the processing chamber and means located at the upper end of the processing chamber for drawing off the expanded Perlite which has been carried upwardly with the combustion gases.

3. A furnace according to claim 2, wherein said second tube is provided with a series of ports extending therethrough in an upwards and slightly tangential direction.

4. A furnace for heat treating expandable volcanic rock known as Perlite and like expandable materials comprising a vertical combustion chamber bounded by a wall consisting of a circular lower part and a frusto-conical upper part, said chamber having an outlet at the tapered upper end thereof, separate inlets for fuel mixture and air, a centrally located first tube arranged below the outlet, said tube extending downwardly through the combustion chamber and out through the lower end thereof, a second tube arranged concentrically around said first tube, a series of fins secured to the outer surface of said first tube, said fins being inclined to the horizontal, the air inlet being connected to the second tube; a vertical processing chamber bounded by a circular wall arranged above the combustion chamber, a nozzle connected to the outlet of the combustion chamber and the lower end of the processing chamber, and a pair of nozzles arranged tangentially to the inner wall at the base of the combustion chamber through which the fuel mixture is injected into the combustion chamber, a funnel arranged on top of the first tube, the diameter of which is greater than the diameter of the nozzle connecting the combustion and processing chamber, a hinged door located at the bottom of the first tube, a series of ports extending through the second tube in an upwards and slightly tangential direction, the direction being in the same sense as that of the motion of the air imparted by said fins, a hopper located at the top of the processing chamber for delivering the Perlite to be treated in free fall downwardly against the upward flow of combustion gases in the processing chamber and means located at the upper end of the processing chamber for drawing off the expanded Perlite which has been carried upwardly with the combustion gases.

References Cited by the Examiner

UNITED STATES PATENTS

| | | | |
|---|---|---|---|
| 2,129,523 | 9/38 | Butler | 263—21 |
| 2,139,378 | 12/38 | Meyers et al. | 252—378 |
| 2,317,003 | 4/43 | Vissac | 34—172 |
| 2,746,735 | 5/56 | Bradford | 263—21 |
| 2,877,717 | 3/59 | Reed | 23—259.5 |
| 2,976,128 | 3/61 | Latham et al. | 23—259.5 |

WILLIAM F. O'DEA, *Acting Primary Examiner.*

JOSEPH R. LIBERMAN, CHARLES SUKALO, *Examiners.*